(12) United States Patent
Tseng et al.

(10) Patent No.: US 6,172,974 B1
(45) Date of Patent: Jan. 9, 2001

(54) NETWORK ELEMENT HAVING TANDEM FREE OPERATION CAPABILITIES

(75) Inventors: Yichyun Tseng; Amarjit Deol, both of Plano, TX (US)

(73) Assignee: Nortel Networks Limited, Montreal (CA)

(*) Notice: Under 35 U.S.C. 154(b), the term of this patent shall be extended for 0 days.

(21) Appl. No.: 08/961,953

(22) Filed: Oct. 31, 1997

(51) Int. Cl.[7] .................................................. H04Q 11/00
(52) U.S. Cl. ............................................................ 370/357
(58) Field of Search ..................................... 370/328, 336, 370/468, 465, 470, 477, 357, 286, 287, 395

(56) References Cited

U.S. PATENT DOCUMENTS

| | | | |
|---|---|---|---|
| 5,533,121 | * 7/1996 | Suzuki et al. | 379/410 |
| 5,539,744 | * 7/1996 | Chu et al. | 370/397 |
| 5,633,868 | * 5/1997 | Baldwin et al. | 370/331 |
| 5,689,556 | * 11/1997 | Gupta et al. | 379/410 |
| 5,768,308 | * 6/1998 | Pon et al. | 375/219 |
| 5,793,810 | * 12/1999 | Han et al. | 375/242 |
| 5,818,843 | * 10/1998 | Virdee et al. | 370/435 |
| 5,956,673 | * 9/1999 | Weaver, Jr. et al. | 704/221 |
| 6,006,189 | * 12/1999 | Strawczynski et al. | 704/270 |
| 6,009,383 | * 12/1999 | Mony | 704/200 |

* cited by examiner

Primary Examiner—Huy D. Vu
Assistant Examiner—Jasper Kwoh
(74) Attorney, Agent, or Firm—John D. Crane

(57) ABSTRACT

A method and apparatus for achieving tandem free operation (TFO) including bypass transcoding and cross transcoding in a communication system. The present invention provides communication of compressed voice signals, or voice signals compressed in a common format, between wireless mobile stations across a PSTN by bypassing vocoders residing in the MSC/BSC of the communication system, or between network elements of an ATM network. In a wireless network, a capability signal, preferably being a low frequency tone, is transmitted by the terminating MSC/BSC to the originating MSC/BSC to indicate that the terminating element is capable of transcoding or transcoding and cross transcoding. The originating element responsively generates an optional LF tone and a 2100 Hz tone to disable network cancellers between the originating element and the terminating element in the forward direction. The terminating element, then, responsively generates a 2100 Hz tone to disable network echo cancellers between the terminating element and the originating element in the backward direction, whereby the vocoders of the network are bypassed. Compression and decompression of voice signals is only provided by the vocoders integrated into the terminating wireless mobile stations.

6 Claims, 4 Drawing Sheets

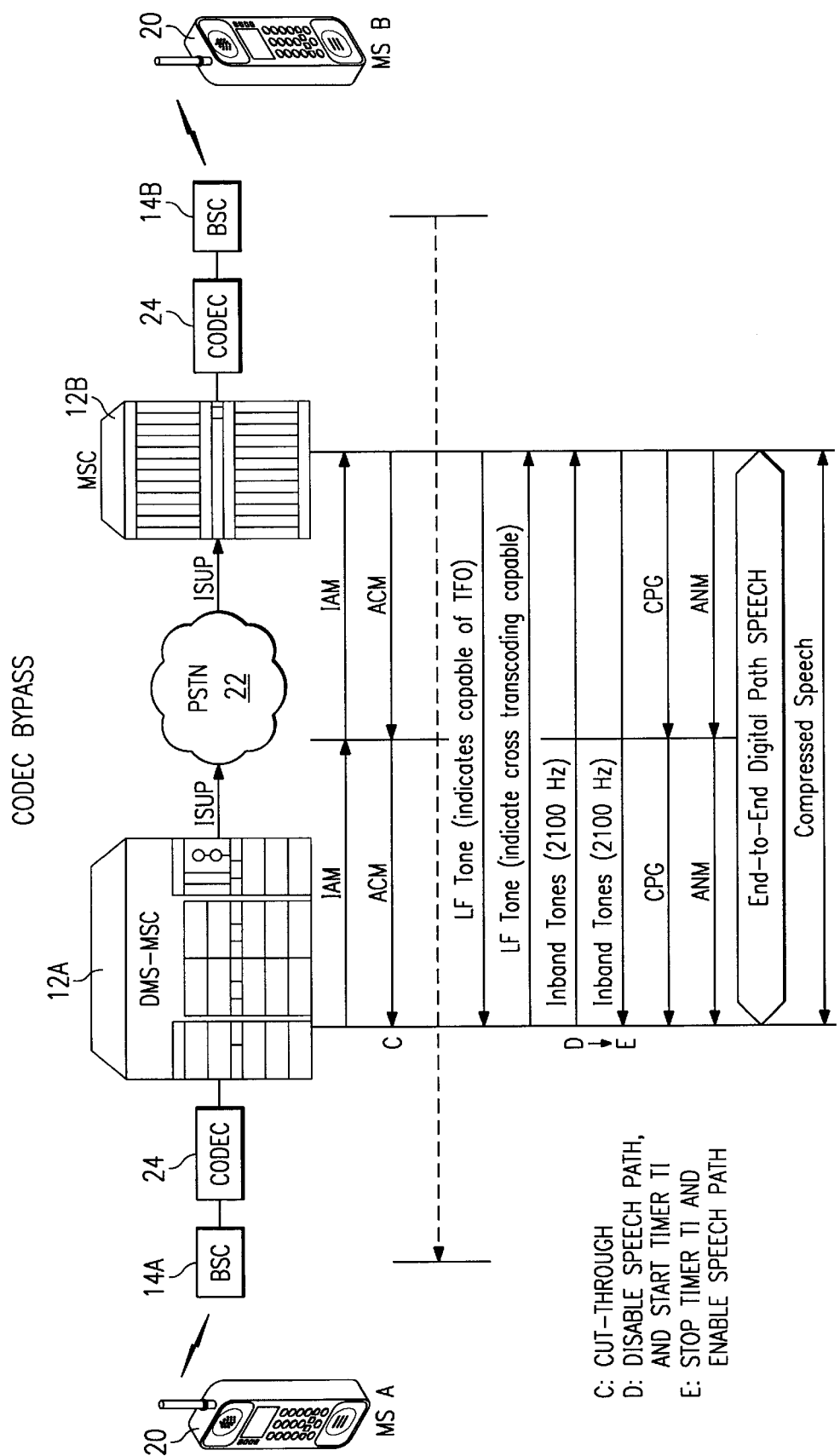

NETWORK ELEMENT HAVING TANDEM FREE OPERATION CAPABILITIES

CROSS REFERENCE TO RELATED APPLICATIONS

Cross reference is made to commonly assigned U.S. patent application Ser. No. 08/883,353 filed on Jun. 26, 1997 entitled "Method and Apparatus for Improving the Voice Quality of Tandemed Vocoders", commonly assigned international application PCT 95CA704 filed Dec. 13, 1995, and U.S. patent application Ser. No. 08/961,957, entitled "Method of Identifying Network Equipment Features", filed herewith, the teachings of each which are incorporated herein by reference.

FIELD OF THE INVENTION

The present invention generally relates to a method and apparatus for transmitting compressed digitized voice signals in a communication environment that may be of a wireless nature, and more specifically, to a method and apparatus for improving the quality of speech signals transmitted between terminals of a communication network having tandemed vocoders, particularly between two mobile stations.

BACKGROUND OF THE INVENTION

The rapid growth in the diversity of communication networks and the number of users of such networks is increasing the number of instances where two vocoders are placed in tandem to serve a single connection. The name "vocoder" stems from the fact that the vocoder is a codec having applications specific to encoding and decoding, i.e. compressing and decompressing, voice signals. Vocoders provide speech compression of a digitized voice signals as well as the reverse transformation. Typically, a voice signal is digitized through one of many quantization techniques. Examples of these techniques are Pulse Amplitude Modulation (PAM), Pulse Code Modulation (PCM) and Delta Modulation. For purposes of this description we will refer to PCM as the input format for the vocoder although no limitation to this format is intended for use by the present invention. A vocoder includes an encoder stage that will accept as input a digitized voice signal and output a compressed signal, a possible compression ratio being 8:1. As for the reverse transformation, the vocoder is provided with a decoder stage that accepts the compressed speech signal and outputs a digitized signal, such as PCM samples.

In many wireless communication networks, a first vocoder integrated in a mobile station is used to compress the speech of a first mobile user. The compressed speech is transmitted by Radio Frequency (RF) equipment to a base station controller (BSC) and a mobile switching center (MSC) serving the local mobile station. Either the BSC or the MSC has a second vocoder, depending on the particular wireless system i.e. TDMA, GSM etc., which decompresses the received compressed signal into PCM samples. The PCM samples are transmitted over a digital trunk of the network, such as a public switched telephone network (PSTN), to a second MSC and BSC serving a second mobile station. A third vocoder at the second BSC or MSC then recompresses the PCM samples for RF transmission to the second mobile station. A fourth vocoder integrated into the second mobile station then decompresses the received compressed speech signal to synthesize the original speech signal from the first mobile station. Such an arrangement of multiple vocoders is commonly referred to as tandemed vocoders which serve a single connection. A specific example of tandemed vocoders may involve a call from a wireless terminal operating according to the North American Time Division Multiplexing Access (TDMA) system to a European Standard Global System for Mobile (GSM) mobile phone.

The main advantage of compressing speech for RF transmission is that it uses less of the limited available RF channel bandwidth for transmission, while the main disadvantage is the loss of speech quality. Operating tandemed vocoders significantly degrades the voice quality of speech, thus providing the desire to limit the number of times that speech is compressed and decompressed in a single connection i.e. between two mobile users.

As disclosed in commonly assigned international application PCT 95CA704 there is disclosed a method to eliminate the condition of tandemed vocoders through a method called tandem free operation (TFO). TFO is defined as a codec bypass action if the vocoders in both mobile stations are the same, e.g. both GSM vocoders. TFO is also defined as using a common format across the transport network if the vocoders at each terminal are different e.g. GSM-CDMA. The basic idea behind this approach is the provision of a digital signal processor including a vocoder, and a bypass mechanism that is invoked when the incoming signal is in a format compatible with a downstream vocoder. Through signaling and control, the digital signal processor associated with the first BSC or MSC serving the first mobile station determines that a compatible vocoder resides at a second BSC or MSC serving a second mobile station. In such a case, the first digital signal processor associated with the first BSC or MSC, rather than converting the compressed speech signals into digital samples, i.e. using a PCM format, invokes the bypass mechanism and outputs the compressed speech to the transport network. The second digital signal processor associated with the second BSC or MSC receives the compressed speech from the transport network and also invokes the bypass mechanism. Compression of the digitized speech signal occurs only once, at the first mobile station, and decompression of the compressed speech signal occurs only once, at the second mobile station. The contents of this international application are incorporated herein by reference.

There is desired an improved mechanism for identifying the capability of wireless network equipment to facilitate TFO in a wireless communication system such as to improve voice quality.

SUMMARY OF THE INVENTION

The present invention achieves technical advantages as a method and apparatus generating a signal, preferably low frequency tone, and transmitting the signal on a voice channel between elements of a communication network to identify the capabilities of the terminating communication element. The low frequency tone is initiated by the terminating communication element. An originating communication element detects and responds based on a predefined TFO agreement prior to a TFO deployment, to the signal (tone) by disabling network echo cancellers between the originating element and the terminating element in the forward direction. The terminating element detects and responds to such disabling of the network echo cancellers by inturn disabling network echo cancellers between the terminating element and the originating element in the backward direction. The present invention is ideally suited for use in a wireless communications network including mobile communication stations.

The present invention derives technical advantages using an in-band signaling scheme for feature identification, i.e. codec bypass, smart transcoding and cross transcoding, without degrading end-to-end voice quality by taking advantage of the sharp rolloff of the frequency response at the low end of most digital to analog convertors (DACs) utilized in digital communication networks. Specifically, the present invention preferably utilizes a low frequency digital tone, such as, but not limited to 35 Hz, having a frequency that is significantly under the 300 Hz rolloff frequency of conventional DACs, although other signaling schemes are contemplated by the present invention. The digital tone is only utilized a few tenths of a millisecond, and does not have enough energy to irritate a caller. Thus, the impact to the caller is minimal, if any.

The low frequency tone is generated by a tone generator at the terminating element of the network. Tone detection circuitry at the originating element taps into the voice channel and utilizes a band pass filter (BPF) to separate the tone from the rest of the signal/noise. The energy out of the BPF is tested against a preset threshold level to determine whether or not the tone is present. A codec bypass/smart transcoding control circuit at the originating element responds according to the output of the tone detection circuitry.

An echo canceller disable tone generator responds to the output of the codec bypass control circuit by disabling network echo cancellers between the originating element and the terminating element in the forward direction when the tone is detected by transmitting in-band tones at frequency of about 2100 Hz according to a well known method as specified in ITU-T Standard G.165. The terminating element detects the disabling of network echo cancellers and inturn disables the network echo cancellers between the terminating element and the originating element in the backward direction. Tones having different frequencies can be sent by the terminating element and received by the originating element according to the present invention to identify and ascertain multiple capabilities of the originating and terminating elements to facilitate TFO including cross transcoding, and smart transcoding. A low frequency acknowledge tone is sent by the originating terminal prior to the 2100 Hz tone to establish TFO cross transcoding.

The present invention is ideally suited for implementation in the BSC or MSC of a wireless network, but can also be implemented into elements of an ATM (asynchronous transfer mode) network.

BRIEF DESCRIPTION OF THE DRAWINGS

FIG. 2 is a diagram illustrating the message sequence for initiating and completing codec bypass according to the present invention;

DESCRIPTION OF THE PREFERRED EMBODIMENT

Figure 1:
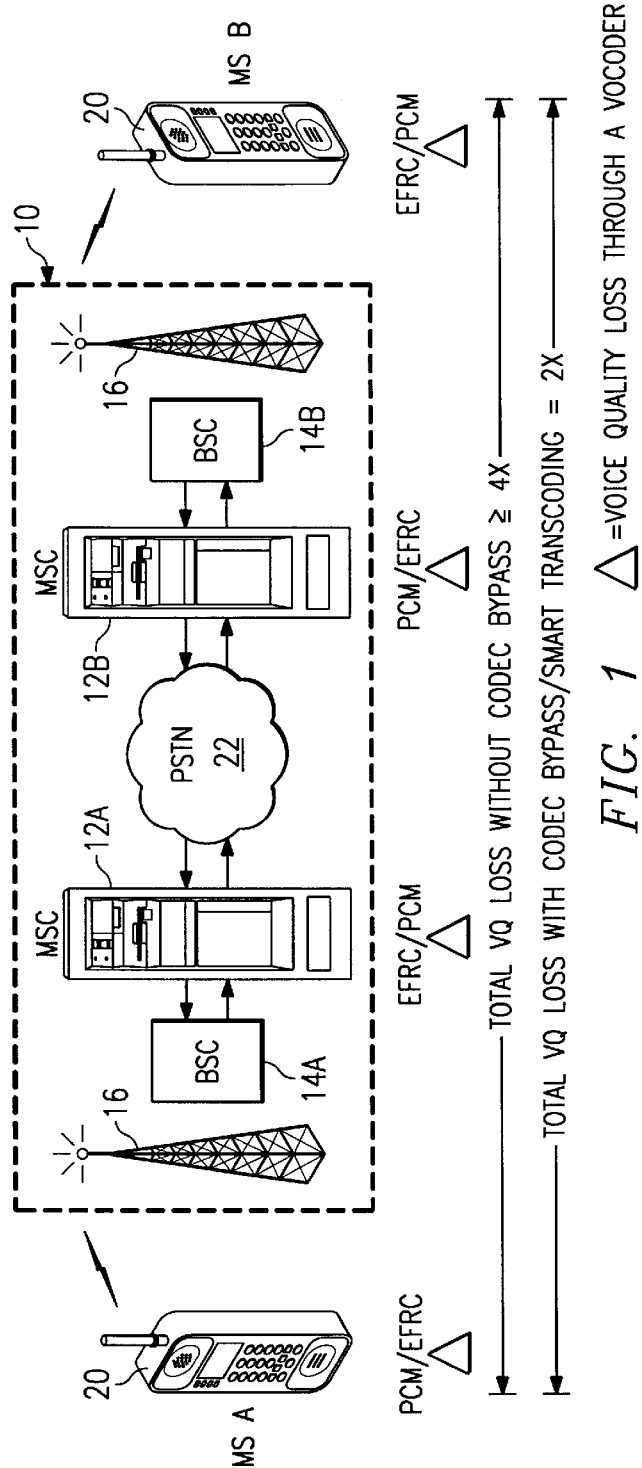
FIG. 1 is a diagram of a wireless communication network serving wireless terminals, illustrating the total voice quality (VQ) loss without codec bypass being 4X, and illustrating the total VQ loss with codec bypass being 2X according to the method and apparatus of the present invention.

Referring now to FIG. 1, there is generally shown at 10 a wireless communication system according to the preferred embodiment of the present invention. System 10 is seen to comprise a plurality of mobile switching centers (MSCs) 12, each MSC servicing and in communication with a plurality of base station controllers (BSCs) 14. Each BSC 14 has an associated antenna station 16 for RF wireless communication with a plurality of mobile stations (MSs) 20. Communication of digitized voice calls between an originating MSC 12 and a terminating MSC 12 is typically established through a public switched telephone network (PSTN) 22. In a typical wireless communication system 10, there are multiple MSCs 12, and multiple BSCs 14 serviced by each MSC 12. For purposes of clarity and illustration of the present invention, there is shown in FIG. 1 an originating BSC 14A and MSC 12A servicing an originating mobile station 20 identified as MS A, and a terminating BSC 14B and MSC 12B servicing a terminating mobile station 20 identified as MS B.

In conventional mobile communication systems, a codec is integrally provided in each mobile station 20, and in each of either the BSCs or MSCs, depending on the type of communication system being employed e.g., TDMA, GSM, etc. For some TDMA systems, the codec 24 is provided in the MSCs, while in GSM systems the codecs 24 may be provided in the BSCs. The codecs perform compression and decompression of speech signals, and thus are commonly referred to as vocoders. For instance, the vocoder provided in mobile station MS A compresses digitized voice for transmission to the respective BSC 14A in a format such as Enhanced Full Rate Codec (EFRC). A vocoder 24 is provided in either the BSC 14A or the MSC 12A to decompress the received voice signal into a digitized format, such as Pulse Code Modulation (PCM). The digitized voice signals are then transmitted over the PSTN 22 to the terminating MSC 12B, and again compressed by the vocoder 24 of either the MSC 12B or the BSC 14B, depending on the particular system, for wireless transmission to the receiving mobile station 20 identified as MS B. The vocoder at MS B decompresses the received voice signal into the digital PCM format, this PCM voice signal then being converted into an audio signal for reception by the mobile station user.

The main advantage of compressing speech is that it uses less of the limited available channel bandwidth for transmission. The main disadvantage is loss of speech quality. Most modern low bit-rate vocoders are based on the linear prediction model that separates the speech signal into a set of linear prediction coefficients, a residual signal and various other parameters. Generally, the speech can be reconstructed with good quality from these components. However, degradations are introduced when speech is subjected to multiple instances of vocoders. Each time a voice signal is compressed (encoded) and then decompressed (decoded), there is an associated voice quality (VQ) loss since vocoders discard some voice information to achieve compression.

Each encoding and decoding procedure is represented by the delta symbol in FIG. 1. In a conventional system where voice signals are communicated between two (2) mobile stations, whereby decompressed voice signals are transmitted over the PSTN 22, there is a total voice quality loss of four Delta between mobile station MS A and mobile station MS B when the vocoders at the MSCs 12 or the BSCs 14 are not bypassed.

In commonly assigned International Application PCT 95CA704 filed Dec. 19, 1995, there is disclosed a "bypass" approach to achieve TFO whereby a bypass mechanism is invoked to bypass the vocoders 24 at the BSC/MSC at both the originating and terminating end of the communication systems. This bypass mechanism is invoked when the digital signal processor associated with a first originating base station is identical to the digital signal processor at a receiving second base station. That is, tandem free operation of vocoders is achieved by transmitting compressed voice signals over the PSTN, when the digital signal processors at each base station are identical whereby the mobile stations can decompress voice signals originated by the other mobile station. The teachings of this commonly assigned PCT application is incorporated herein by reference.

In commonly assigned US Patent Application Attorney's Docket Number RM1089 entitled "Method And Apparatus For Improving The Voice Quality Of Tandemed Vocoders", filed Jun. 26, 1997, there is disclosed a method and apparatus to achieve TFO by converting compressed speech signals from one format to another intermediate common format (CF) when the vocoders of the originating and terminating mobile stations are not identical. This method and apparatus provides cross transcoding, also known as smart transcoding, and provides a mean to avoid the necessity of successively decompressing voice data to a PCM format, and then recompressing the voice data which degrades the quality of the transmitted speech signals. A modified compressed voice signal, i.e. common format signal, is transmitted over the PSTN, and the vocoders 24 at the BSC/MSC at both the terminating end and originating end of the communication system are bypassed to achieved tandem free operation. The teachings of this application are also incorporated herein by reference.

Referring now to the present invention, the present invention comprises an apparatus and protocol or signaling algorithm to achieve TFO across a communications network, whereby a MSC/BSC at both ends of a call in a wireless network, or a network element at both ends of a call in an ATM network, can communicate with one another to determine the type and ability of each other to achieve tandem free operation between a pair of stations. That is, the present invention provides a method and apparatus whereby compressed or modified compressed voice signals are exchanged over a transport network such as the PSTN or ATM, and compression/decompression is only performed by the vocoders at the terminal elements or network access elements. The present invention significantly improves the voice quality of the call by eliminating the successive compression/decompression of voice signals.

Referring to FIG. 1, there is illustrated that the total voice quality (VQ) loss with codec bypass/smart transcoding is only 2X when tandem free operation of the vocoders is provided by the present invention. The present invention is an elegant approach to achieve tandem free operation by providing cross transcoding when the vocoders of the particular terminal elements or network access elements are not identical, and providing transcoding when the vocoders of the terminal elements or network access elements are identical, for example, both operate in GSM. Finally, the present invention allows the conventional tandemed vocoding when the vocoders of the terminal elements or network access elements are truly incompatible, and tandemed vocoding is necessary.

Referring to FIG. 2, there is illustrated by this message flow diagram one preferred algorithm of the present invention whereby the terminating MSC 12B in some wireless communication systems e.g. TDMA, or the terminating BSC 14B in other systems e.g. GSM, generates a low frequency tone at a particular frequency upon reception of call initiation signals from the originating MSC 12A/BSC 14A, respectively, to indicate to the originating MSC 12A/BSC 14A that the terminating MSC 12B/BSC 14B is capable of codec bypass in a particular technology. For example, the terminating BSC 14B generates a low frequency (LF) tone at about 35 Hz back to the originating BSC 14A to indicate to the originating BSC 14A that the terminating BSC 14B is capable of performing transcoding in GSM. Performing bypass TFO is disclosed in the previously cross-referenced international patent application PCT 95CA704, the teachings of which are incorporated herein by reference. In another example, the terminating MSC 12B sends the low frequency tone at a frequency at 45 Hz if the terminating MSC 12B is capable of transcoding in TDMA. In yet another example, the terminating MSC 12B sends the low frequency tone at a frequency of 80 Hz if the terminating MSC 12B is capable of transcoding in CDMA.

Figure 5:
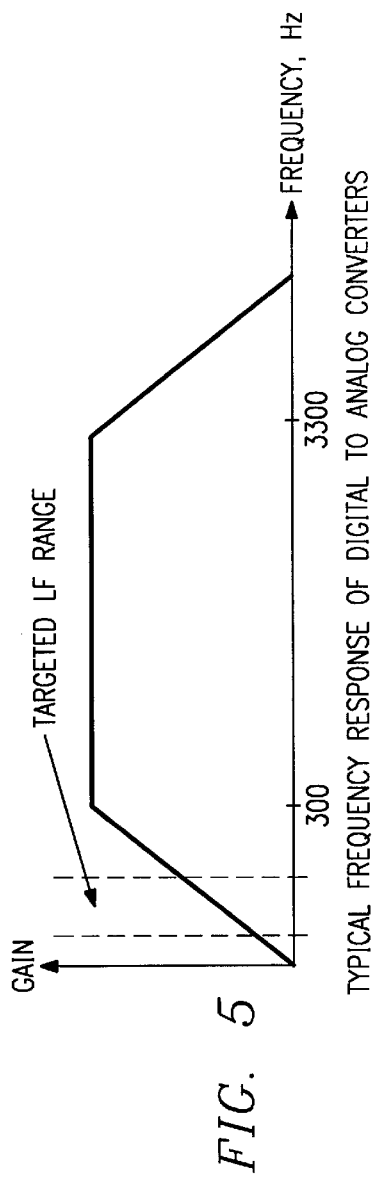
FIG. 5 is a graph of the typical frequency response of D/A converters utilized in mobile stations, whereby the in-band tones are sent at a low frequency substantially below the 300 Hz cutoff frequency of the converter.

The low frequency 35 Hz, 45 Hz and 80 Hz tones are all well below the lower cutoff frequency of typical D/A converters residing in the mobile stations 20, as shown in FIG. 5. This low frequency tone is generated for only a brief period of time, e.g. 30 ms, and at such a low frequency that it is not heard by the mobile users using mobile stations 20.

In still yet a further embodiment of the invention, the network access element of an ATM (asynchronous transfer mode) network can likewise be equipped with the present invention to provide and process these tones to achieve TFO across the ATM network, and limitation to use of a BSC or MSC is not to be inferred in the present invention. For purposes of illustrating the present invention, the following discussion with reference to an MSC or BSC is hereafter used for clarity and brevity.

Still referring to FIG. 2, the originating MSC 12A/BSC 14A, or the network access element of an ATM network, depending on the system technology, includes circuitry (See FIG. 4) for detecting this LF tone from the terminating MSC 12B/BSC 14B, and also for responding to the detection of this signal by generating in-band tones at 2100 Hz to disable network echo cancellers of PSTN 22 between the originating MSC 12A/BSC 14A and the terminating MSC 12B/BSC 14B in the forward direction. Each MSC 12/BSC 14 also includes means for detecting generation of these in-band tones, whereby the terminating MSC 12B/BSC 14B responds to the detection of in-band tones from the originating MSC 12A/BSC 14A by, in turn, generating in-band tones at 2100 Hz to disable the network echo cancellers in the backward direction. The generation of in-band tones in each direction between the MSCs 12/BSCs 14 over the PSTN to disable echo cancellers is generated with phase reversal per the ITU-T G.165 standard.

According to an alternative embodiment to the present invention, the low frequency tone is generated at a specific frequency, by the terminating MSC/BSC to indicate to the originating MSC/BSC that the terminating MSC/BSC is equipped with predefined multi-vocoder capability, e.g.

GSM and transcoding in a common format. For example, a low frequency tone at 170 Hz is sent by the terminating MSC 12B/BSC 14B to indicate to the originating MSC 12A/BSC 14A that the terminating MSC 12B/BSC 14B is capable of TFO by using either a particular transcoding technology, such as GSM, and cross transcoding technology, also known as smart transcoding. To perform cross transcoding the resident vocoder 24 of the MSC 12B/BSC 14B includes circuitry converting compressed speech to the common format such as disclosed in the commonly assigned previously referenced U.S. Patent application Attorney's Docket Number RM1089, entitled "Method and Apparatus for Improving the Voice Quality of Tandemed Vocoders", the teachings of which are incorporated herein by reference. This 170 Hz tone is detected by tone detection circuitry 40 at the originating MSC 12A to ascertain that the GSM codec at the terminating mobile station 20 MS B may not be identical to the codec at the originating mobile station 20 MS A. When the codecs of both mobile stations are not identical, an acknowledge tone, e.g. 140 Hz is sent by the originating MSC 12A/BSC 14A, to inform the terminating MSC 12B/BSC 14B that it is capable of smart transcoding, and followed by sending an in-band 2100 Hz tone to disable the network echo cancellers. The aforementioned tones instruct the terminating MSC 12B/BSC 14B to convert the compressed speech from mobile station MS B to the common format compressed voice signals for transmission over the PSTN 22. By sending this 140 Hz tone, the vocoder 24 at the originating MSC 12A/BSC 14A is indicating that it is capable of cross transcoding, and it thereafter sends all future compressed speech in the common format. Tandem free operation of the vocoders is still achieved, with only one compression/decompression sequence being provided in each direction between the respective communicating mobile stations 20. If the terminating MSC 12B/BSC 14B is a CDMA system and capable of both transcoding (bypass operation) and cross transcoding in the common format, the tone is sent at a frequency of 190 Hz. Likewise, if the terminating MSC 12B/BSC 14B is a TDMA system and capable of transcoding in the common format, the tone is sent at a frequency of 220 Hz. The technology and capabilities of the terminating MSC 12B/BSC 14B related to the frequency at the sent tone is depicted in Table 1 below.

TABLE 1

| TONE FREQUENCY | INDICATED TECHNOLOGY AND TFO CAPABILITIES |
| --- | --- |
| 35 Hz | GSM, Bypass only |
| 45 Hz | TDMA, Bypass only |
| 80 Hz | CDMA, Bypass only |
| 170 Hz | GSM, Bypass and Common format |
| 190 Hz | CDMA, Bypass and Common Format |
| 220 Hz | TDMA, Bypass and Common Format |

The representations of various tones that indicates the type of transcoding and cross transcoding are predefined during the network setup or planning stage prior to the implementation of this invention.

Figure 3:
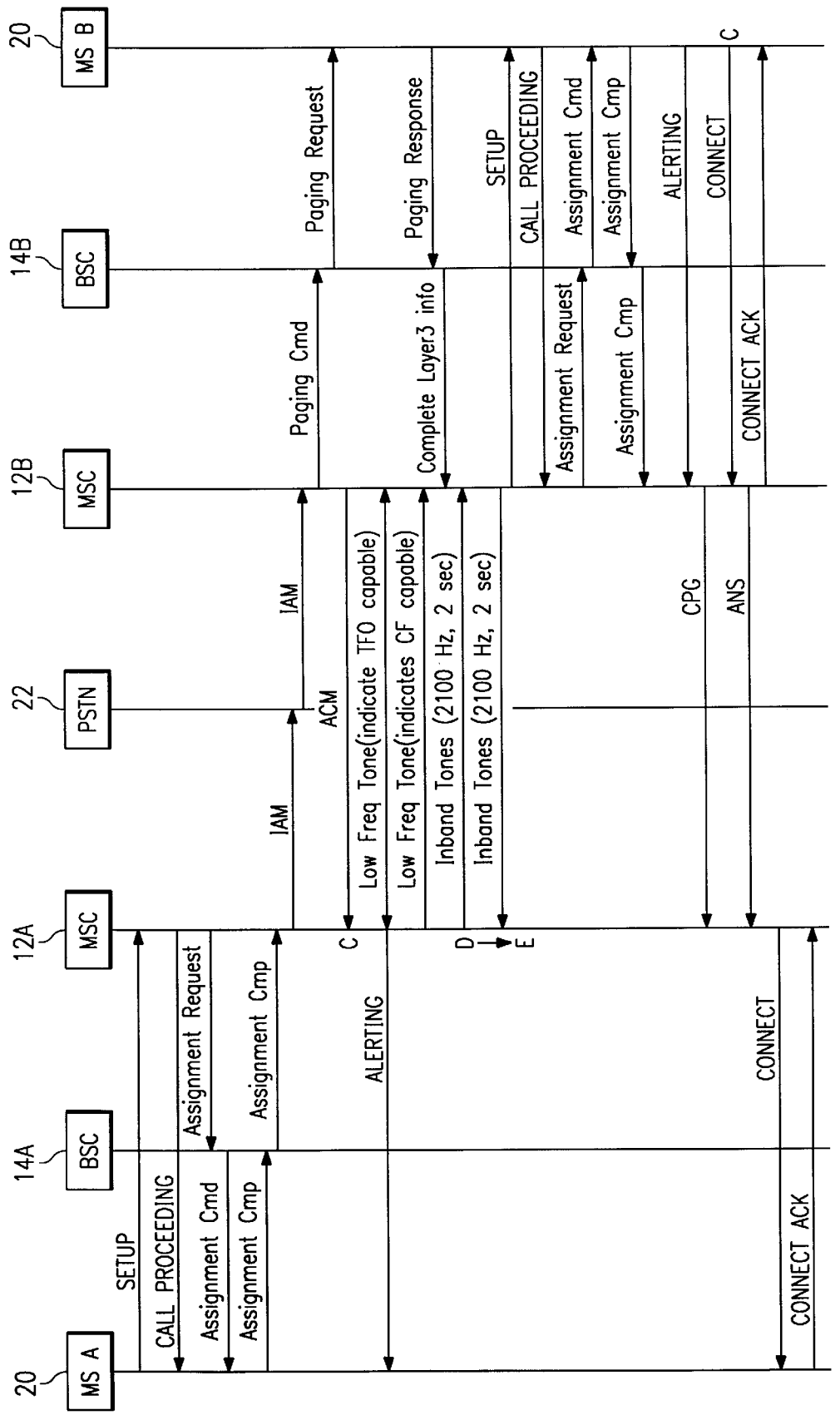
FIG. 3 is a message flow diagram illustrating the terminating MSC/BSC generating a low frequency in-band tone to indicate to the originating MSC/BSC that it is capable of tandem free operation (TFO) including transcoding and/or cross transcoding, and the subsequent disabling of network echo cancellers.

Referring now to FIG. 3, there is illustrated a simplified message flow for a typical GSM call according to the present invention. Each step for establishing the voice call is dictated by standards such as GSM 4.08, GSM 8.08, GSM 9.02, and Q761–Q764, and is well known with the exception of the additional steps according to the protocol or algorithm of the present invention. Specifically, in the case of GSM call, after the terminating MSC 12B receives the LAM message and cut-through/after sending the ACM message, the terminating MSC 12B momentarily generates the low frequency tone of approximately 35 Hz to indicate to the originating MSC 12A that the terminating MSC 12B is capable of codec bypass TFO operation. Alternatively, the tone is sent at a frequency of 170 Hz to indicate that the terminating MSC 12B is capable of both codec bypass and cross transcoding in the common format. While 35 Hz and 170 Hz are the preferred frequencies, other low frequency tones between 20 Hz and 300 Hz are suitable for indicating TFO operation according to the present invention, although low frequencies between 20 and 220 Hz are preferred to stay well under the 300 Hz cutoff of conventional DAC's and to avoid generating an in-band tone which may be detectable by the user. Thus, it is preferred that a signal be used that has a frequency well below the low frequency cutoff of the D/A converter of the mobile stations.

At step D, the originating MSC 12A detects this low frequency 35 Hz tone from the terminating MSC 12B, and generates in-band tones at about 2100 Hz for a two (2) second period to disable the network echo cancellers across the PSTN 22. If the 170 Hz tone is detected, the originating MSC 12A first sends the 140 Hz acknowledge tone to inform the terminating MSC 12B that future voice signals are to be communicated in the common format to achieve cross transcoding. At step D, the speech path between the MS and the MSC/BSC is disabled, and a timer is started. The terminating MSC 12B detects the generation of the in-band tones generated and transmitted by the originating MSC 12A and, in turn, responsively generates 2100 Hz in-band tones at step E to disable the echo cancellers across the PSTN 22 in the reverse direction. At step E, the timer is stopped, and the speech path is enabled. This is necessary to avoid the detection by the users of the end band tones for this two second period. It is necessary to disable the echo cancellers in both directions across the PSTN 22 to prevent the distortion of compressed voice signals being sent over the PSTN. Thereafter, the rest of the call setup steps are performed according to the well known standardized signaling algorithms to complete the call between the originating mobile station MS A and the terminating mobile station MS B.

According to the present invention there is provided a signaling scheme that is performed by the terminating MSC/BSC, depending on the particular type of call e.g. TDMA, GSM, CDMA etc., to indicate to the originating BSC/MSC that the terminating MSC/BSC is capable of TFO, including transcoding and cross transcoding operation, and the specific technology of the terminating MSC/BSC. While a low frequency tone is the preferred embodiment to the present invention, it is contemplated by the present invention that other signaling schemes could be utilized to indicate the capabilities and technology of the terminating MSC/BSC. For instance, a first FSK signal utilizing one pair of frequencies can indicate one capability or technology, and a second alternative FSK pair of signals can indicate another capability or technology. More simply, a first tone can indicate one capability, and a second tone can indicate another capability/capabilities. It is preferred and most suitable for the present invention that any signaling established and generated by the terminating MSC/BSC be at a frequency well below the 300 Hz lower cut off frequency of the D/A in the mobile stations 20 to prevent the mobile user from detecting the signals. Again, the method and apparatus of the present invention provides a signaling scheme which can be utilized to provide transcoding or tandem free operation, as outlined in the cross-referenced commonly assigned patent applications.

Figure 4:
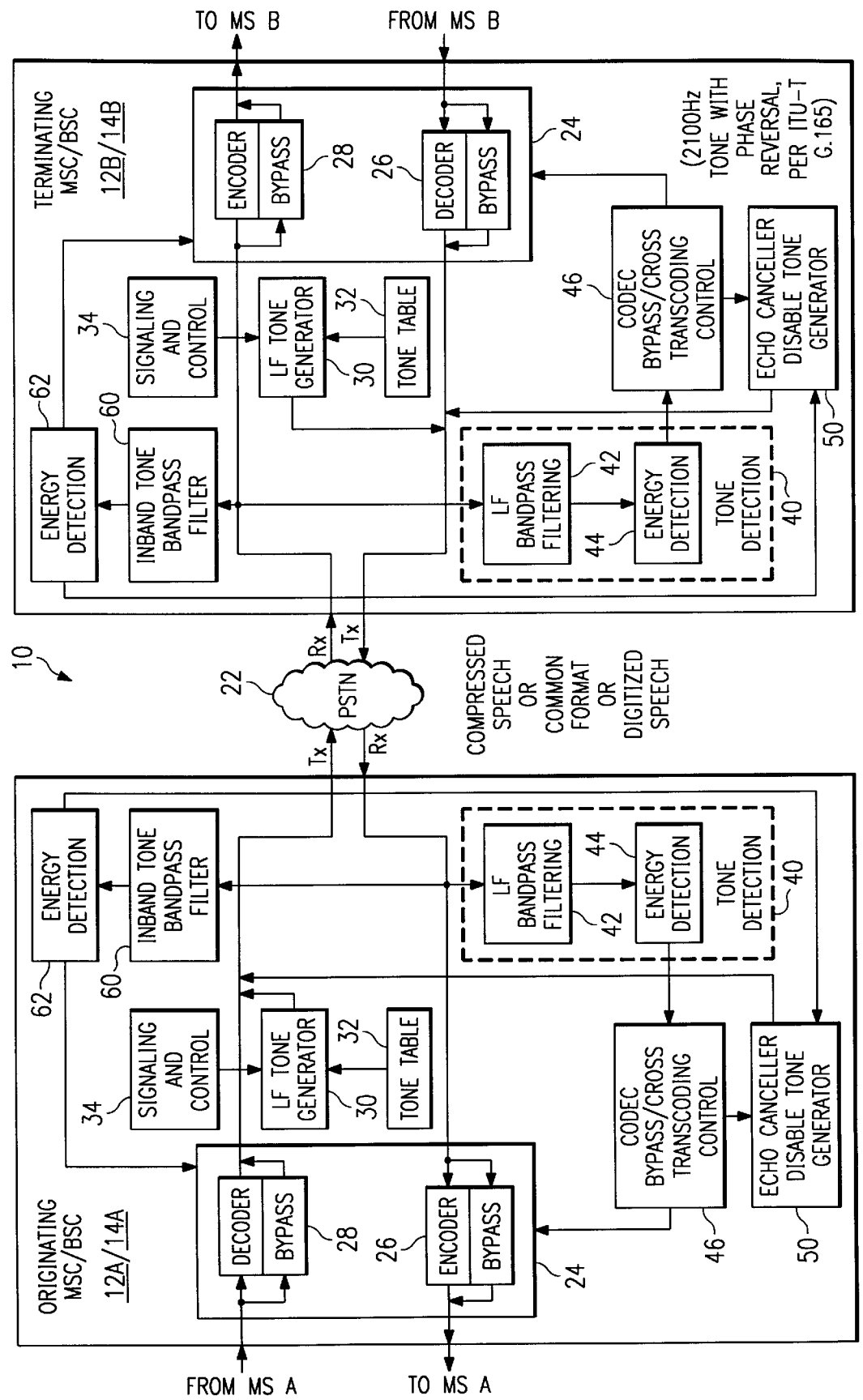
FIG. 4 is a block diagram of a wireless communication system providing cross transcoding whereby the vocoders at the originating system element and the terminating system element can be selectively disabled to provide tandem free operation such that compressed speech, or speech compressed in a common format, is transmitted over a PSTN to improve voice quality between a pair of mobile stations.

Referring now to FIG. 4, there is shown a block diagram of the wireless communications system 10 with improved MSCs and/or BSCs according to the preferred embodiment of the present invention. Both the originating MSC 12A/BSC 14A and the terminating MSC 12B/BSC 14B are identical, but need not be, and for purposes of illustration and clarity to understand the present invention, the left MSC/BSC will be referred to as the "originating" MSC/BSC which services the originating mobile station 20 identified as MS A. The right MSC/BSC will be referred to as the "terminating" MSC/BSC and services mobile station 20 identified as MS B. Each has similar capabilities, but the associated particular features will be discussed for illustration.

The terminating MSC 12B/BSC 14B is seen to include a low frequency (LF) tone generator 30 and a tone table 32. The LF tone generator 30 utilizes the tone table 32 to generate a LF tone, responsive to instructions from signaling and control circuit 34 which handles signaling and control operations of the respective MSC 12B/BSC 14B. When the signaling and control circuit 34 detects an incoming call i.e., a call initiation signal, at the receiver port Rx from the originating MSC 12A/BSC 14A via PSTN 22, the signaling and control circuit 34 responds thereto by instructing the LF tone generator 30 to generate the low frequency tone indicative of the vocoder 24 technology and capabilities (See Table 1) for a brief period of time, for instance 30 ms. This LF tone is generated at the appropriate frequency and output to the transmitter line Tx and sent via the PSTN 22 to the originating MSC 12A/BSC 14A.

The originating MSC 12A/BSC 14A is seen to include at least one tone detection circuitry 40 comprising a low frequency (LF) bandpass filter 42 and an energy detection circuit 44. One bandpass filter 42 is provided for each respective tone to be detected. The particular LF bandpass filter 42 detects the presence of the particular LF tone frequency at the receiver port/receiver line Rx. The energy detection circuit 44 determines if the energy of the tone at the particular frequency passed by filter 42 exceeds a predetermined threshold, indicating a valid tone being received from the terminating MSC 12B/BSC 14B. This detected tone at the originating MSC 12A/BSC 14B indicates that the terminating MSC 12B/BSC 14B is capable of tandem free operation. Detecting a 35 Hz tone indicates GSM transcoding capabilities, and detecting a 170 Hz tone indicates both transcoding and cross transcoding capabilities. A codec bypass/cross transcoding control circuit 46 at the originating MSC 12A/BSC 14A responds to a variable output control signal generated by the energy detection circuit 44 indicative of the particular received valid tone by instructing and controlling the vocoder 24 to correspondingly operate in the bypass mode or smart transcoding mode. The originating MSC 12A/BSC 14A responsively sends a tone at 140 Hz to inform the terminating MSC 12B/BSC 14B that communication will be established/exchanged in the common format only if cross transcoding is to be performed. Then, the codec bypass/cross transcoding control 46 responsively instructs and controls an echo canceller disabler tone generator 50 to generate tones to disable the echo cancellers through PSTN 22 from the originating MSC 12A/BSC 14A to the terminating MSC 12B/BSC 14B. This is accomplished by generating a 2100 Hz tone with phase reversal per the ITU-T G.165 standards protocol. This 2100 Hz tone sent across the PSTN 22 disables all echo cancellers in the forward direction to facilitate the transmission of compressed voice signals without distortion.

The terminating MSC 12B/BSC 14B is seen to include an in-band tone bandpass filter 60 coupled to the receiving line Rx of the respective MSC 12B/BSC 14B. This in-band tone bandpass filter 60 detects the presence of the 2100 Hz tone being received from the originating MSC 12A/BSC 14A, whereby an energy detection circuit or module 62 compares the output of the filter 60 to a predetermined threshold to validate the presence of the 2100 Hz signal. The echo canceller disable tone generator 50 of the terminating MSC 12B/BSC 14B responds to an output signal of energy detection module 62 by, responsively, generating a 2100 Hz tone with phase reversal per ITU-T G.165 to disable all echo cancellers in the backward direction across PSTN 22 between the terminating MSC 12B/BSC 14B and the originating MSC 12A/BSC 14A. At the same time, the vocoder 24 responds to the output signal of energy detection circuit 62 by operating in the bypass mode, or in the cross transcoding mode if the 140 Hz acknowledge tone was first detected by the tone detection circuitry 40, thereby disabling the encoder 26 and the decoder 28 of vocoder 24. Thus, both vocoders 24 at both ends of the link are now operating in the bypass mode, or cross transcoding mode as appropriate. This allows compressed voice signals that are received by the respective MSC and BSC to pass straight through to the PSTN 22 in the compressed format thereby achieving tandem free operation since the vocoders 24 are bypassed.

In summary, one of several tones can be sent by the terminating MSC/BSC to indicate the capability of the resident vocoder 24, directing the originating vocoder 24 to send voice signals in a bypass mode or in common format that is understandable by the vocoder at the terminating end. All frequencies of the tone that is sent by the terminating station are less than the 300 Hz cut off frequency of the D/A resident in the mobile stations. It is to be understood that, other signaling schemes can be utilized i.e. FSK, and limitation to using a single frequency tone is not to be inferred. The present invention encompasses the terminating MSC/BSC indicating the technology and capabilities of its vocoder to the originating MSC/BSC so the compressed voice signals can be exchanged therebetween. The 35 Hz, 45 Hz and 80 Hz tone is sent when the vocoders at both the originating end and the terminating end are the same to operate in the bypass mode, depending on the vocoder technology, and the 170 Hz, 190 Hz and 220 Hz tone is selectively sent to achieve smart transcoding, depending on the vocoder technology. In both instances, voice is compressed and decompressed only once in each direction between the originating station and the terminating station.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. In a voice communication system which includes an originating unit having a first vocoder, a first base station in wireless communication with and serving the originating unit, a first BSC/MSC having a vocoder in the first base station, a terminating unit having a second vocoder, a second base station in wireless communication with and serving the terminating unit, a second BSC/MSC having a vocoder in the second base station, the base stations being interconnectable via a voice channel, the units each containing an A/D-D/A converter, apparatus for achieving TFO of the system wherein the vocoders in both BSC/MSCs are bypassed, which apparatus comprises:

signaling means in the second base station responsive to the receipt of a call initiation signal sent by the originating unit via the first BSC/MSC and the channel for sending a short duration, low frequency signal via the channel to the first base station, the frequency of the signal indicating the type and capabilities of the vocoder in the terminating unit and having a frequency which is significantly less than the rolloff frequency of the A/D-D/A converters;

analyzing means in the first base station for analyzing the received low frequency signal and determining whether digital signals from the first vocoder are compatible with the second vocoder; and control means in the base stations
  (a) for directing digital voice signals between the units around, and bypassing, both BSC/MSC vocoders in the base stations if the second vocoder is compatible with the digital signals from the first vocoder, and
  (b) for directing digital voice signals between the vocoders of the units through the BSC/MSC vocoders in a tandem mode if the second vocoder is not compatible with the digital signals from the first vocoder.

2. The apparatus of claim 1, wherein:

when the control means performs function (a),
  (I) the first and second vocoders communicate in the same format if they are of the same type and utilize the same communication protocol; or
  (ii) the first and second vocoders communicate in a common format, such as cross transcoding or smart transcoding, if such vocoders are not of the same type; and incompatibility of the first and second vocoders is characterized by neither of the foregoing conditions (I) or (ii) obtaining.

3. Apparatus as in claim 1, wherein the base stations also contain echo cancelers across the channel, and wherein:

the control means disables the echo cancelers if the BSC/MSC vocoders are to be bypassed.

4. The apparatus of claim 2, wherein:

the low frequency tone indicates both the type of the second vocoder and the communications protocols compatible therewith.

5. The apparatus of claim 1, which further includes:

signaling means in the first base station responsive to the low frequency signal produced by the signaling means in the second base station for producing a low frequency signal which is sent to the second base station via the channel, such low frequency signal indicating the communication capabilities of the first vocoder; and control means in the second base station responsive to the low frequency signal from the first base station for preparing the second base station to receive communications from the first base station in a format compatible with the capabilities of the second vocoder.

6. Apparatus as in claim 5, wherein the base stations also contain echo cancelers across the channel, and wherein:

one or both of the control means effects disabling the echo cancelers if the BSC/MSC vocoders are to be bypassed.

\* \* \* \* \*